United States Patent
Wood

[15] 3,655,386
[45] Apr. 11, 1972

[54] ANTI-STATIC COATINGS FOR PHOTOGRAPHIC MATERIALS

[72] Inventor: Henry Walter Wood, Ilford, England
[73] Assignee: Ilford Limited, Ilford, Essex, England
[22] Filed: Feb. 9, 1970
[21] Appl. No.: 9,951

[30] Foreign Application Priority Data

Feb. 10, 1969　Great Britain..................7,151/69

[52] U.S. Cl. ..............................96/87 A, 96/67
[51] Int. Cl..........................................G03c 1/82
[58] Field of Search .........................96/87 A, 67

[56] References Cited

UNITED STATES PATENTS 2,639,234　5/1953　Morey et al................96/87
2,725,297　11/1955　Morey......................96/87 X

*Primary Examiner*—Ronald H. Smith
*Attorney*—Cushman, Darby & Cushman

[57] ABSTRACT

This application describes a method for improving the surface conductivity of photographic material which is characterized in that it comprises coating on to the surface of the photographic material an aqueous alcohol solution which comprises at least 0.2 percent by weight of sodium cellulose sulfate which has, on an average, at least two sulfate radicals per glucose unit in the cellulose chain, and then drying the photographic material.

5 Claims, No Drawings

ANTI-STATIC COATINGS FOR PHOTOGRAPHIC MATERIALS

This invention relates to photographic film material provided with an antistatic layer and to the production of such film material.

It is known that photographic film material exhibits a tendency to pick up electrostatic charges during the course of its manufacture and also when it is being processed. When an electrostatically charged film is discharged so called "static marks" are produced. These marks show as areas of local over-exposure on the developed film. It is possible to reduce the tendency of photographic film to pick up electrostatic charges by the provision of a layer which has a relatively high electroconductivity. Any electrostatic charges picked up by a film having such a layer rapidly leak to earth without causing a discharge.

It is the object of the present invention to provide a method of improving the surface conductivity of photographic material.

According to the present invention there is provided a method of improving the surface conductivity of photographic film material which comprises coating on to the surface of the photographic material an aqueous alcohol solution which comprises at least 0.2 percent by weight of sodium cellulose sulfate which has a high degree of substitution and then drying the photographic material. Preferably the said solution is prepared by adding sufficient water-miscible alcohol to an aqueous solution of the sodium cellulose sulfate to make the solution opalescent.

By "sodium cellulose sulfate which has a high degree of substitution" is meant sodium cellulose sulfate which has, on an average, at least two sulfate radicals per glucose unit in the cellulose chain.

The term "photographic film material" is used herein to include photographic material in which the support is a plastics film and photographic material in which the support is of paper provided with surface layers of plastics material.

The photographic material produced by the process of the present invention comprises a base support there being coated on at least one side a single emulsion layer, a single emulsion layer + supercoat layer, a plurality of emulsion layers, or a plurality of emulsion layers + a supercoat layer, there being coated on at least one topmost layer and/or on the side of the support which carries no emulsion or supercoat, if one side is uncoated, a layer which comprises sodium cellulose sulfate.

It is an important preferred feature of the process of the present invention that an aqueous alcohol solution of the sodium cellulose sulfate should be opalescent. Sodium cellulose sulfate is not soluble in organic solvents and when the alcohol is added to an aqueous solution of sodium cellulose sulfate a stage is reached when the solution becomes opalescent. If the addition of the alcohol to the solution is continued the solution turns milky and finally the sodium cellulose sulfate is precipitated. If the aqueous alcohol solution of sodium cellulose sulfate is not opalescent when it is coated on to the film material the layer obtained after drying has a lesser conductivity. At a certain concentration of alcohol relative to the concentration of sodium cellulose sulfate in solution a physical change in the condition of the sodium cellulose sulfate molecules occurs. When a layer of sodium cellulose sulfate is formed with the molecules in this condition a layer of relatively high conductivity is obtained. This change in the physical state of the molecules of sodium cellulose sulfate occurs at about the time that the solution becomes opalescent.

However if too much alcohol is added the physical state of the molecules is further changed and the sodium cellulose sulfate is precipitated. When too much sodium cellulose sulfate has been precipitated from the solution, the solution can not be coated evenly on to the photographic material and a coherent layer can not be obtained on drying.

The relative volumes of water to alcohol present in the opalescent solution of sodium cellulose sulfate depends on a number of different factors, for example the percentage by weight of sodium cellulose sulfate in the aqueous alcohol solution and on the alcohol used.

The preferred alcohol is methanol. Other suitable alcohols are, for example, isopropanol, ethanol and t-butanol.

A particularly useful sodium cellulose sulfate having a high degree of substitution is obtainable from the Kelco Corporation. A 1 percent by weight solution of the Kelco sodium cellulose sulfate has a viscosity of 80 centipoises. This sodium cellulose sulfate has been used in the examples which follow.

EXAMPLE 1.

Strips from the same sample of photographic material which comprised a single gelatino silver halide emulsion layer and supercoat on both sides of a cellulose triacetate base support were coated on each supercoat layer with a number of different aqueous/methanol solutions of sodium cellulose sulfate. One sample was left uncoated to serve as control.

Two tests were carried out on each of the strips. In one test the film strips were brought to equilibrium at a relative humidity of 20 percent and their resistivities at this humidity were measured under an applied potential of 10Kv. The results of this test are shown in the table as set forth below.

In another test, also carried out at 20 percent R.H., the propensity of the film strips to static formation was assessed. An indication of how quickly the applied charge was dissipated was obtained by measuring the field again after 20 seconds. The results are shown in the table which follows.

The strips were charged by being passed between rubber rollers to create a static charge which was measured by a juxtaposed field meter.

TABLE 1

| Percent SCS by weight | Percent MeOH volume | Field (v./cm) Peak | Field (v./cm) 20" decay | Resistivity (ohm/sq) | Appearance of solution |
|---|---|---|---|---|---|
|  |  | >390 | 320 | 13.7 |  |
| 1 | 0 | >390 | 320 | 13.7 | Clear. |
| 1 | 10 | >390 | 360 | 13.5 | Do. |
| 1 | 20 | >390 | 360 | 13.5 | Do. |
| 1 | 30 | >390 | 310 | 13.1 | Do. |
| 1 | 40 | 160 | 50 | 11.4 | Slightly opalescent. |
| 1 | 50 | 110 | 30 | 11.1 | opalescent. |

These results show that with a 1 percent by weight aqueous/methanol solution of sodium cellulose sulfate no effect is obtained if 30 percent or less methanol is present in the solution.

EXAMPLE 2.

Substantially the same pattern of results was observed when the solutions were coated direct onto cellulose triacetate film base.

A 1 percent sodium cellulose sulfate in 50:50 mixtures of other alcohols was used. The results obtained are listed below in Table 2.

TABLE 2

| Alcohol | Field Peak | Field 20" decay | Resistivity | Appearance |
|---|---|---|---|---|
| Control | >390 | 260 | 13 2 |  |
| Ethanol | 70 | 50 | 11.6 | Opalescent. |
| Isopropanol | 80 | 5 | 11.6 | Opalescent. |
| t-Butanol | 120 | 40 | 11.8 | Opalescent. |

It is to be understood that the invention includes not only the process for the production of photographic material which comprises at least one top-most layer of relatively high conductivity but also the photographic material produced by the process.

I claim as my invention:

1. A method for improving the surface conductivity of photographic silver halide light-sensitive material which is characterized in that it comprises coating on to the surface of the photographic material an aqueous alcohol solution which comprises at least 0.2 percent by weight of sodium cellulose sulfate which has, on an average, at least two sulfate radicals per glucose unit in the cellulose chain, said solution being prepared by adding sufficient water-miscible alcohol to an aqueous solution of the sodium cellulose sulfate to make the solution opalescent and then drying the photographic material.

2. A method according to claim 1 wherein the photographic material comprises a film base carrying at least one photographic silver halide emulsion layer and the said solution is applied to the surface of the outermost emulsion layer.

3. A method according to claim 1 wherein the photographic material comprises a film base carrying at least one photographic silver halide emulsion layer and a superimposed gelatin supercoat layer, and the said solution is applied to the surface of the said supercoat layer.

4. A method according to claim 1 wherein the photographic material comprises a film base carrying on one side only thereof at least one photographic silver halide emulsion layer, and the said solution is applied to the other side of the said film base.

5. Photographic silver halide light-sensitive material which is made by the method of claim 1 and which has on one surface thereof a dried layer of sodium cellulose sulfate having, on average, at least two sulfate radicals per glucose unit in the cellulose chain.

* * * * *